United States Patent
Park et al.

(10) Patent No.: US 12,307,214 B2
(45) Date of Patent: May 20, 2025

(54) HYBRID LANGUAGE TRANSLATION ON MOBILE DEVICES

(71) Applicant: QUALCOMM Incorporated, San Diego, CA (US)

(72) Inventors: Kee-Hyun Park, San Diego, CA (US); Sungrack Yun, Seongnam (KR); Kyu Woong Hwang, Daejeon (KR)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 17/952,025

(22) Filed: Sep. 23, 2022

(65) Prior Publication Data

US 2024/0104311 A1  Mar. 28, 2024

(51) Int. Cl.
  *G06F 40/58* (2020.01)
  *G06F 40/51* (2020.01)
  *G10L 15/16* (2006.01)

(52) U.S. Cl.
  CPC ............ *G06F 40/58* (2020.01); *G06F 40/51* (2020.01); *G10L 15/16* (2013.01)

(58) Field of Classification Search
  CPC ........... G06F 40/58; G06F 40/51; G10L 15/26
  See application file for complete search history.

(56) References Cited

U.S. PATENT DOCUMENTS

| | | | |
|---|---|---|---|
| 10,402,500 B2* | 9/2019 | Chochowski | G10L 15/26 |
| 2007/0219774 A1 | 9/2007 | Quirk et al. | |
| 2012/0278060 A1 | 11/2012 | Cancedda et al. | |
| 2013/0144595 A1* | 6/2013 | Lord | G06F 40/58 704/2 |
| 2015/0120296 A1* | 4/2015 | Stern | G10L 15/30 704/236 |
| 2016/0364385 A1* | 12/2016 | Waibel | G10L 13/02 |
| 2018/0276203 A1* | 9/2018 | Cuthbert | G10L 25/48 |

(Continued)

FOREIGN PATENT DOCUMENTS

| | | |
|---|---|---|
| KR | 20160085100 A | 7/2016 |
| WO | 2019223437 A1 | 11/2019 |
| WO | 2021154411 A1 | 8/2021 |

OTHER PUBLICATIONS

Clover J., "IOS 14: Apple's Built-In iPhone Translate App that Works with 11 Languages", Jan. 25, 2021, pp. 1-21.

(Continued)

*Primary Examiner* — Stella L. Woo
(74) *Attorney, Agent, or Firm* — Seyfarth Shaw LLP

(57) ABSTRACT

A processor-implemented method for recognizing a natural language on a mobile device includes receiving an audio input. The method further includes using a neural network to generate local text corresponding to the audio input. The method still further includes generating a local confidence value for accuracy of the local text. The method includes transmitting, to a remote device, data corresponding to the audio input. The method further includes receiving remote text corresponding to the data, along with a remote confidence score for accuracy of the remote text. The method still further includes outputting the local text in response to the local confidence value being higher than the remote confidence score, and outputting the remote text in response to the remote confidence score being higher than the local confidence value.

24 Claims, 15 Drawing Sheets

(56) References Cited

U.S. PATENT DOCUMENTS

2019/0108222 A1\* 4/2019 Anglin ................... G06F 40/58
2019/0279620 A1\* 9/2019 Talwar ................... G10L 15/22

OTHER PUBLICATIONS

Iqram S., "Google Translate Improves Offline Translation", Dec. 19, 2019, 5 Pages.
International Search Report and Written Opinion—PCT/US2023/028497—ISA/EPO—Oct. 5, 2023.

\* cited by examiner

HYBRID LANGUAGE TRANSLATION ON MOBILE DEVICES

FIELD OF INVENTION

Aspects of the present disclosure generally relate to natural language translation on a mobile device.

BACKGROUND

Artificial neural networks may comprise interconnected groups of artificial neurons (e.g., neuron models). The artificial neural network may be a computational device or may be represented as a method to be performed by a computational device.

Neural networks consist of operands that consume tensors and produce tensors. Neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Various types of neural networks, such as convolutional neural networks and deep neural networks, may be used in technologies, such as image recognition, pattern recognition, speech recognition, autonomous driving, and other classification tasks. One application for neural networks is the area of natural language translation. Conventional translation may be a cloud-based solution in which the processing is performed on a cloud server. Natural language translation on mobile devices, such as smartphones, has recently become popular, but the translation performed on the cloud server is non-real-time and suffers from extensive delay, resulting in a poor user experience.

SUMMARY

The present disclosure is set forth in the independent claims, respectively. Some aspects of the disclosure are described in the dependent claims.

In aspects of the present disclosure, a processor-implemented method for recognizing a natural language on a mobile device includes receiving an audio input. The method also includes using a neural network to generate local text corresponding to the audio input. The method further includes generating a local confidence value for accuracy of the local text. The method also includes transmitting, to a remote device, data corresponding to the audio input. The method includes receiving remote text corresponding to the data, along with a remote confidence score for accuracy of the remote text. The method also includes outputting the local text in response to the local confidence value being higher than the remote confidence score. The method also includes outputting the remote text in response to the remote confidence score being higher than the local confidence value.

In other aspects of the present disclosure, a processor-implemented method for recognizing a natural language on a mobile device includes receiving an audio input. The method also includes using a neural network to generate a local translation corresponding to the audio input. The method further includes transmitting, to a remote device, data corresponding to the audio input. The method includes receiving a remote translation.

Other aspects of the present disclosure are directed to an apparatus. The apparatus has a memory and one or more processors coupled to the memory. The processor(s) is configured to receive an audio input. The processor(s) is also configured to use a neural network to generate local text corresponding to the audio input. The processor(s) is further configured to generate a local confidence value for accuracy of the local text. The processor(s) is configured to transmit, to a remote device, data corresponding to the audio input. The processor(s) is also configured to receive remote text corresponding to the data, along with a remote confidence score for accuracy of the remote text. The processor(s) is configured to output the local text in response to the local confidence value being higher than the remote confidence score. The processor(s) is also configured to output the remote text in response to the remote confidence score being higher than the local confidence value.

Other aspects of the present disclosure are directed to an apparatus. The apparatus has a memory and one or more processors coupled to the memory. The processor(s) is configured to receive an audio input. The processor(s) is also configured to use a neural network to generate a local translation corresponding to the audio input. The processor(s) is further configured to transmit, to a remote device, data corresponding to the audio input. The processor(s) is configured to receive a remote translation.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
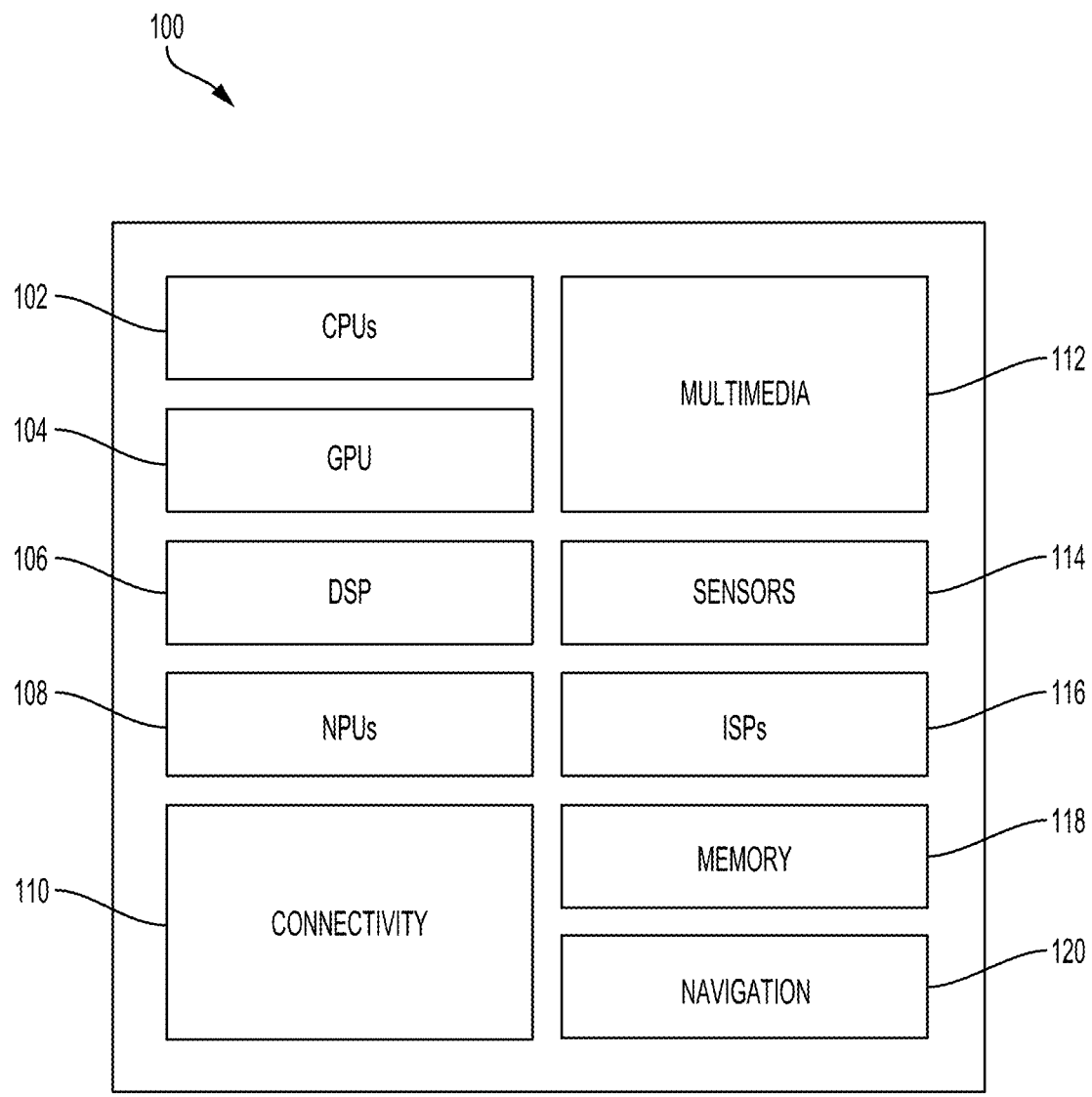
FIG. 1 illustrates an example implementation of a neural network using a system-on-a-chip (SoC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, neural networks have been applied in the area of natural language translation. A natural language is a language that is a native speech that has developed naturally in humans through use and repetition as a method of communication as opposed to an artificial language constructed for programming computers.

Natural language translation on mobile devices, such as smartphones, has recently become popular. For example, the mobile translation may aid people that do not speak the same natural language. Mobile translation may also be beneficial for translating live or prerecorded streaming audio or audio portios of video or other multimedia, speech-to-text transcriptions, or any other suitable use for automatic speech recognition. Conventional translation may be a cloud-based solution in which the processing is generally performed on a cloud server. A cloud server is a logical computer server that is hosted remotely, offering its resources to remote users over a network. For instance, cloud-based translation may enable websites and applications to translate text programmatically through an application programming interface (API). Cloud translators exhibit improved performance with a powerful machine learning technology (e.g., personalization), but the end-to-end delay is significant (e.g., two to three seconds). A user's speech is captured and transmitted to a remote server over a network, where it is analyzed and translated before being sent back to a client device. This substantial delay is not suitable for a natural communication (e.g., a conversation).

On-device translators are able to respond more quickly with significantly less delay (e.g., on the order of hundreds of milliseconds). However, the translation accuracy for such on-device translators may be significantly lower than that of cloud-based translators due to the limited computing resources. Additionally, on-device translators may lack personalization and thus, unlike cloud-based translators, may not consider a user's accent, culture, or other pertinent characteristics, for example.

Accordingly, to address these and other challenges, aspects of the present disclosure are directed to hybrid language translation on mobile devices. In accordance with aspects of the present disclosure, an on-device translation output may be compared with a cloud-based translation result and corrected based on a confidence metric. In some aspects, the on-device translation may be based on negative user feedback.

FIG. 1 illustrates an example implementation of a processing system 100 that may be implemented as a system-on-a-chip (SoC), a packaged device, interconnected components, a mobile device, or any other suitable processing system. The processing system 100 may include a central processing unit (CPU) 102 or a multi-core CPU configured for hybrid translation for a mobile device via an artificial neural network. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118. The memory block 118, in particular, is likely to be implemented with a different process on a different die. The system 100 may include any compatible additional elements (e.g., antenna/radio frequency front end (RFFE) for the connectivity module, speakers/microphones for the multimedia module, screen(s) for the GPU, etc.

The processing system 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The processing system 100 may also include a sensor processor 114, image signal processors (ISPs) 116, and/or navigation module 120, which may include a global positioning system.

The processing system 100 may be based on an ARM instruction set. In aspects of the present disclosure, the instructions loaded into the general-purpose processor 102 may include code to receive an audio input, use a neural network to generate local text corresponding to the audio input, and transmit, to a remote device, data corresponding to the audio input. The general-purpose processor 102 may also include code to generate a local confidence value for accuracy of the local text, and receive remote text corresponding to the data, along with a remote confidence score for accuracy of the remote text. The general-purpose processor 102 may further include code to output the local text in response to the local confidence value being higher than the remote confidence score, and output the remote text in response to the remote confidence score being higher than the local confidence value.

Deep learning architectures may perform a speech recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to a speech recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

The connections between layers of a neural network may be fully connected or locally connected. In a fully connected neural network, a neuron in a first layer may communicate its output to every neuron in a second layer, so that each neuron in the second layer will receive input from every neuron in the first layer. In a locally connected neural network, a neuron in a first layer may be connected to a limited number of neurons in the second layer. More generally, a locally connected layer of the locally connected neural network may be configured so that each neuron in a layer will have the same or a similar connectivity pattern, but with connections strengths that may have different values. The locally connected connectivity pattern may give rise to spatially distinct receptive fields in a higher layer, because the higher layer neurons in a given region may receive inputs that are tuned through training to the properties of a restricted portion of the total input to the network.

One type of convolutional neural network is a deep convolutional network (DCN). The DCN may be trained with supervised learning. During training, the DCN may be presented with a sound and a forward pass may then be computed to produce an output. The DCN may include a feature extraction section and a classification section. Upon receiving the sound, a convolutional layer may apply convolutional kernels (not shown) to the sound to generate a first set of feature maps. As an example, the convolutional kernel for the convolutional layer may be a 5×5 kernel that generates 28×28 feature maps. In the present example, because four different feature maps are generated in the first set of feature maps, four different convolutional kernels were applied to the sound at the convolutional layer. The convolutional kernels may also be referred to as filters or convolutional filters.

The first set of feature maps may be subsampled by a max pooling layer to generate a second set of feature maps. The max pooling layer reduces the size of the first set of feature maps. That is, a size of the second set of feature maps, such as 14×14, is less than the size of the first set of feature maps, such as 28×28. The reduced size provides similar information to a subsequent layer while reducing memory consumption. The second set of feature maps may be further convolved via one or more subsequent convolutional layers (not shown) to generate one or more subsequent sets of feature maps (not shown).

The second set of feature maps may be convolved to generate a first feature vector. Furthermore, the first feature vector is further convolved to generate a second feature vector. Each feature of the second feature vector may include a number that corresponds to a possible feature of the sound. A softmax function may convert the numbers in the second feature vector to a probability. As such, an output of the DCN is a probability of the sound including one or more features.

In the present example, the probabilities in one output may be higher than the probabilities of the others of the output. Before training, the output produced by the DCN is likely to be incorrect. Thus, an error may be calculated between the output and a target output. The target output is the ground truth of the sound (e.g., the word "Hello"). The weights of the DCN may then be adjusted so the output of the DCN is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g.,) receiving input from a range of neurons in the previous layer (e.g., feature maps) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 2:
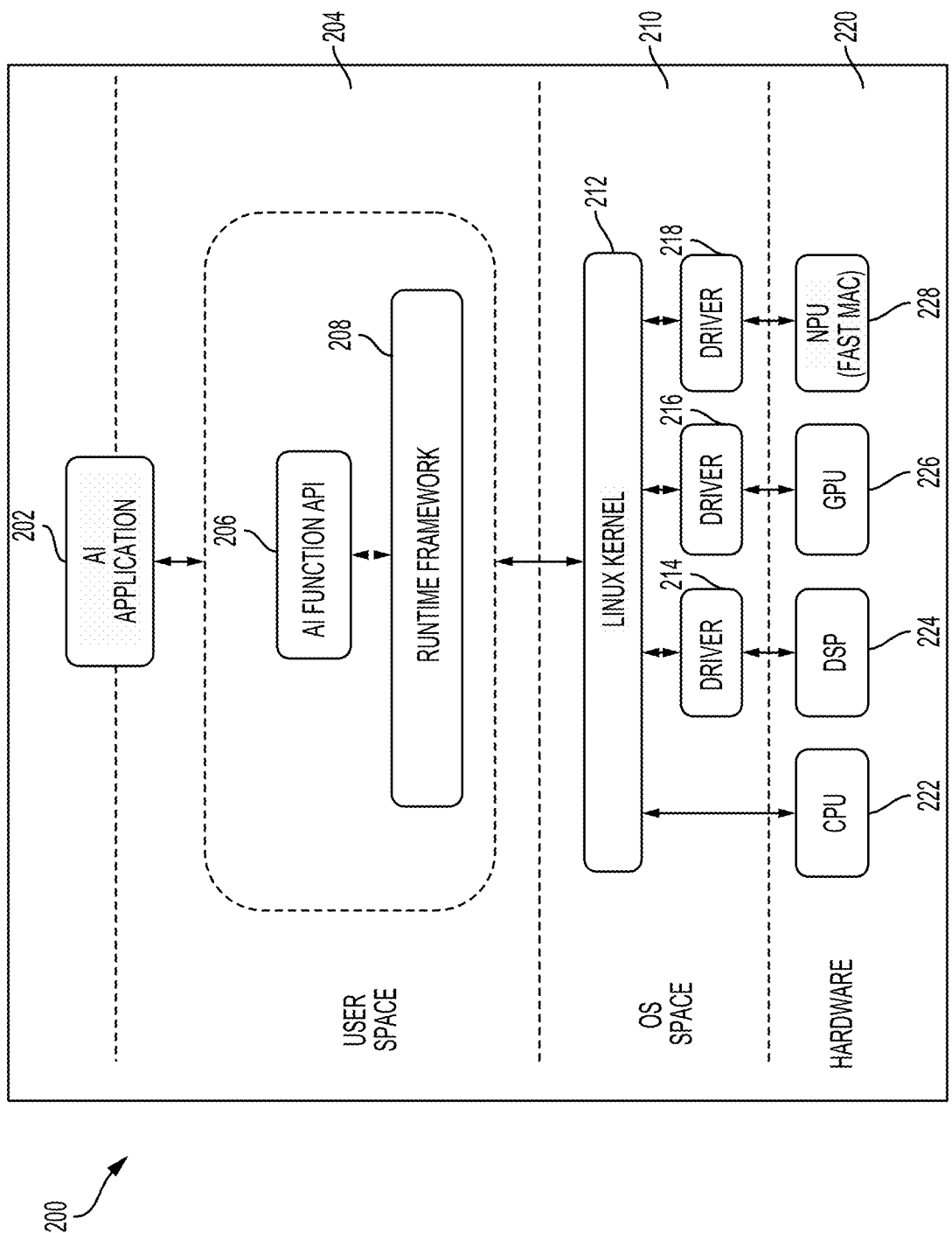
FIG. 2 is a block diagram illustrating an exemplary software architecture that may modularize artificial intelligence (AI) functions.

FIG. 2 is a block diagram illustrating an exemplary software architecture 200 that may modularize artificial intelligence (AI) functions. Using the architecture 200, applications may be designed that may cause various processing blocks of a system-on-a-chip (SoC) 220 (for example a CPU 222, a DSP 224, a GPU 226 and/or an NPU 228) to support speech recognition as disclosed for an AI application 202, according to aspects of the present disclosure.

The AI application 202 may be configured to call functions defined in a user space 204 that may, for example, provide for the detection and recognition of a scene indicative of the location in which the device currently operates. The AI application 202 may, for example, configure a microphone and a camera differently depending on whether the recognized scene is an office, a lecture hall, a restaurant, or an outdoor setting such as a lake. The AI application 202 may make a request to compiled program code associated with a library defined in an AI function application programming interface (API) 206. This request may ultimately rely on the output of a deep neural network configured to provide an inference response based on video and positioning data, for example.

A run-time engine 208, which may be compiled code of a runtime framework, may be further accessible to the AI application 202. The AI application 202 may cause the run-time engine, for example, to request an inference at a particular time interval or triggered by an event detected by the user interface of the application. When caused to provide an inference response, the run-time engine may in turn send a signal to an operating system in an operating system (OS) space, such as a Linux Kernel 212, running on the SoC 220. The operating system, in turn, may cause a continuous relaxation of quantization to be performed on the CPU 222, the DSP 224, the GPU 226, the NPU 228, or some combination thereof. The CPU 222 may be accessed directly by the operating system, and other processing blocks may be accessed through a driver, such as a driver 214, 216, or 218 for, respectively, the DSP 224, the GPU 226, or the NPU 228. In the exemplary example, the deep neural network may be configured to run on a combination of processing blocks, such as the CPU 222, the DSP 224, and the GPU 226, or may be run on the NPU 228.

The application 202 (e.g., an AI application) may be configured to call functions defined in a user space 204 that may, for example, provide for the detection and recognition of a scene indicative of the location in which the device currently operates. The application 202 may, for example, configure a microphone and a camera differently depending on whether the recognized scene is an office, a lecture hall, a restaurant, or an outdoor setting such as a lake. The application 202 may make a request to compiled program code associated with a library defined in a SceneDetect application programming interface (API) 206 to provide an estimate of the current scene. This request may ultimately rely on the output of a differential neural network configured to provide scene estimates based on video and positioning data, for example.

A run-time engine 208, which may be compiled code of a Runtime Framework, may be further accessible to the application 202. The application 202 may cause the run-time engine, for example, to request a scene estimate at a particular time interval or triggered by an event detected by the user interface of the application. When caused to estimate the scene, the run-time engine may in turn send a signal to an operating system 210, such as a Linux Kernel 212, running on the SoC 220. The operating system 210, in turn, may cause a computation to be performed on the CPU 222, the DSP 224, the GPU 226, the NPU 228, or some combination thereof. The CPU 222 may be accessed directly by the operating system, and other processing blocks may be accessed through a driver, such as a driver 214-218 for a DSP 224, for a GPU 226, or for an NPU 228. In the exemplary example, the differential neural network may be configured to run on a combination of processing blocks, such as a CPU 222 and a GPU 226, or may be run on an NPU 228.

Aspects of the present disclosure are directed to hybrid language translation on mobile devices. In accordance with aspects of the present disclosure, an on-device translation output may be compared with a cloud-based translation result and corrected based on a confidence metric. In some aspects, the on-device translation may be based on negative user feedback.

Figure 3:
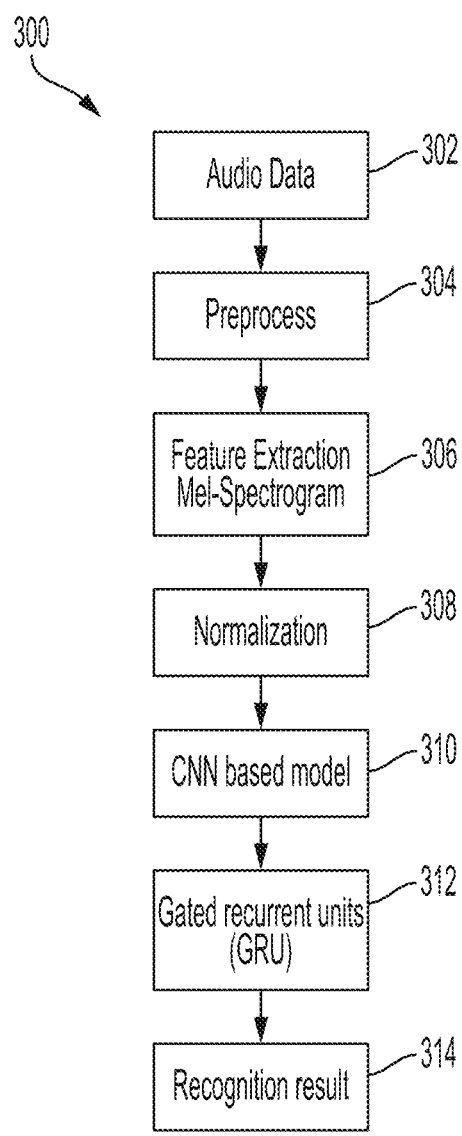
FIG. 3 is a block diagram illustrating an example workflow for audio data recognition.

FIG. 3 is a block diagram illustrating an example workflow 300 for audio data recognition. Referring to FIG. 3, the workflow 300 may receive audio data 302 for processing. The audio data may be supplied to a pre-process block 304. The pre-process block 304 may format the audio data 302 by segmenting or padding the audio data 302, for instance. The pre-processed audio data may be supplied to a feature extraction block 306. The feature extraction block 306 may, for example, be a neural network such as a convolutional neural network (CNN). In some aspects, the feature extraction block 306 may be a Mel spectrogram. A Mel spectrogram is a spectrogram that is converted to a Mel scale. A spectrogram is a visualization of the frequency spectrum of an audio signal (e.g., audio data 302), where the frequency spectrum of a signal is the frequency range of the audio signal. The Mel scale is a scale of pitches that human hearing generally perceives to be equidistant from each other. The Mel spectrogram transforms values of the audio signal (e.g., in Hz) to the Mel scale. The feature extraction block may extract a set of features (e.g., pitch, timbre, and sound intensity) of the audio data 302.

The features extracted may be supplied to a normalization block 308. In some aspects, the normalization block 308 may calculate the mean and standard deviation for each of the extracted features. The mean and standard deviation may be used to normalize the extracted features, for example, to reduce model convergence time.

The normalized features may be supplied to a CNN based model 310. The CNN based model 310 may extract high order features from the normalized features. In turn the higher order features may be supplied to gated recurrent units (GRUs) 312. GRUs 312 enable the workflow 300 to determine an amount of information from a previous time step to pass along to a subsequent time step and which information to drop. The GRUs 312 may summarize temporal information of the extracted higher order feature to compute a recognition result 314.

Figure 4:
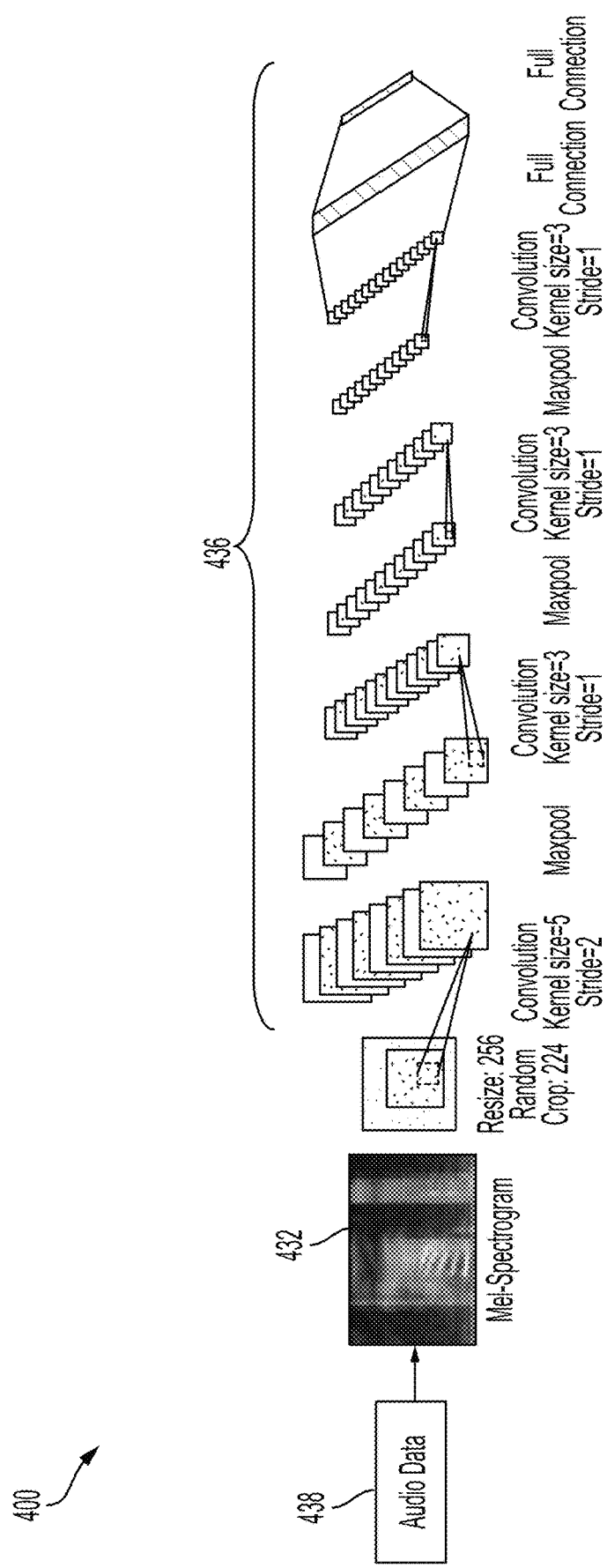
FIGS. 4 and 5 are diagrams illustrating example architectures for audio data recognition, in accordance with aspects of the present disclosure.
Figure 5:
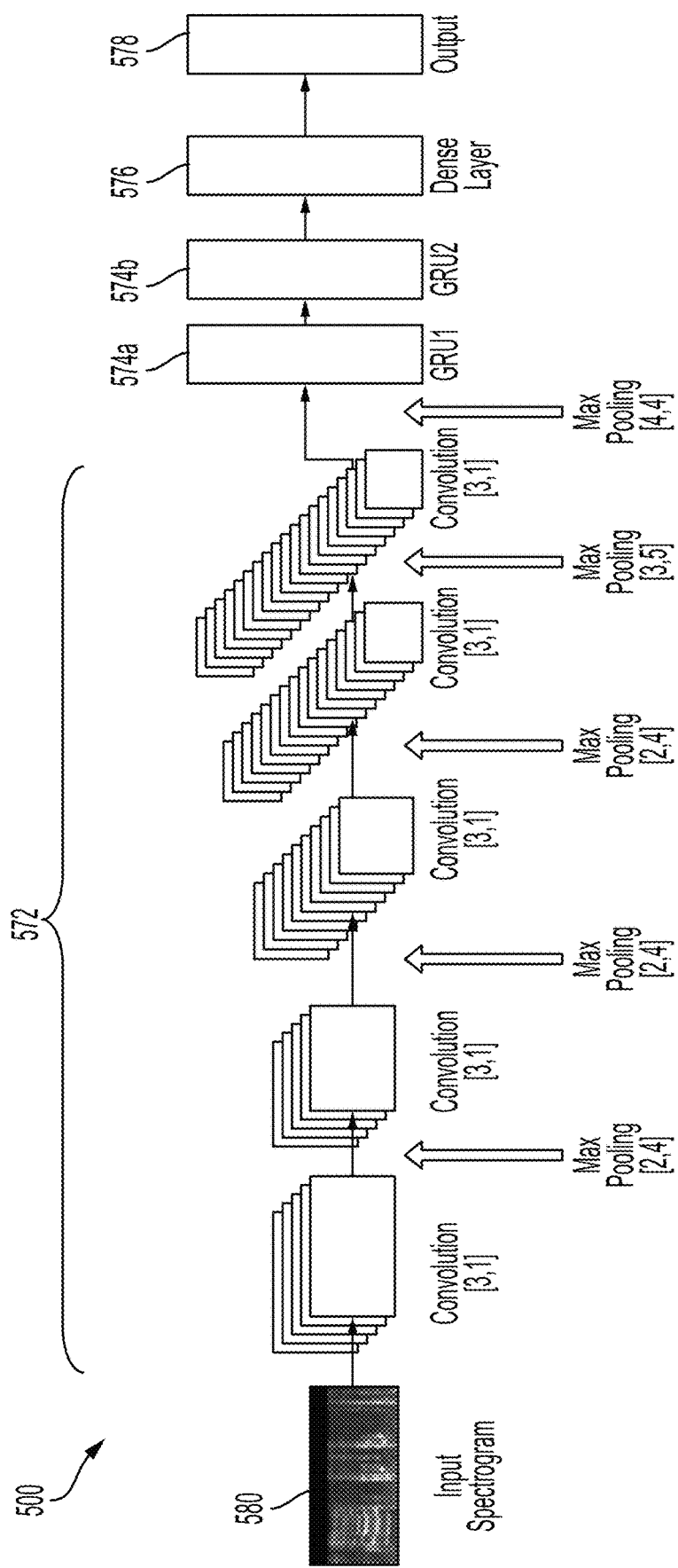

FIGS. 4 and 5 are diagrams illustrating example architectures 400 and 500 for audio data recognition, in accordance with aspects of the present disclosure. Referring to FIG. 4, the architecture 400 includes a Mel spectrogram 432 and a CNN 436. Audio data 438 may be received, and processed and transformed to the Mel spectrogram 432. The Mel spectrogram 432 may extract features of the audio data 438. The extracted features of the audio data 438 may be supplied to the CNN 436. In turn, the CNN 436 may process the extracted features through successive convolutional layers to generate an inference with respect to the input audio data 438. For instance, the inference may be a classification of one or more sounds within the audio data 438.

In FIG. 5, a convolutional recurrent neural network (CRNN) 572 is used in place of the CNN 436 shown in FIG. 4. The CRNN 572 may include multiple convolutional layers with gated recurrent units (GRUs) 574a, 574b. The CRNN 572 may receive audio data. As shown in the FIG. 5 the audio data may be in the form of a spectrogram 580. In some aspects, the spectrogram 580 may be a Mel-spectrogram. The audio data may be processed via the successive convolutional layers of the CRNN 572 to extract features of the audio data. The extracted features may be supplied to the GRUs 574a, 574b. The GRUs 574a, 574b may determine which information (e.g., features) may be passed to a dense layer 576 and an output 578. The GRUs 574a, 574b may use gates to control the flow of information. At each time step, a GRU (e.g., 574a, 574b) may take an input $x_t$ and a hidden state $H_{t-1}$ from a previous time (e.g., t−1) and output a new hidden state $H_t$ which may be passed to a next time step. The new hidden state ht may be determined according to the following:

$$r_t=\sigma(x_t*U_r+H_{t-1}*W_r) \quad (1)$$

$$u_t=\sigma(x_t*U_u+H_{t-1}*W_u) \quad (2)$$

$$\hat{H}_t=\tanh(x_t*U_g+(r_t{}^\circ H_{t-1})*W_g) \quad (3)$$

$$H_t=u_t{}^\circ H_{t-1}+(1-u_t)^\circ \hat{H}_t \quad (4)$$

where $u_t$ represents an update gate, $r_t$ represents a reset gate, $\sigma$ represents the sigmoid function, $^\circ$ represents the Hadamard (elementwise) product, and $U_u$, $W_u$, $U_g$, and $W_g$ represents weight parameters. As such, the GRUs 574a, 574b may summarize temporal information of the extracted features and focus on features that may be more relevant for making a prediction.

Figure 6:
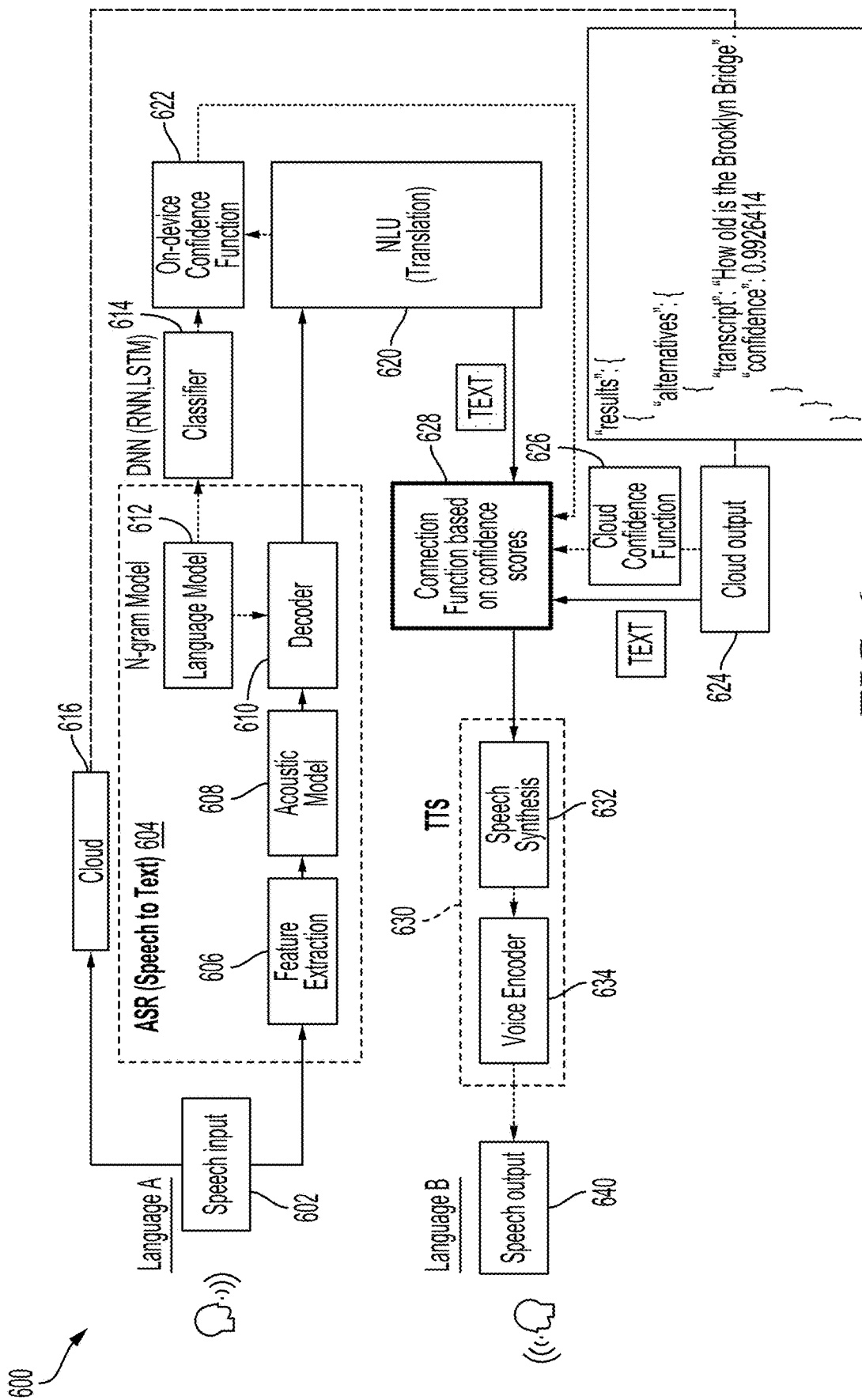
FIG. 6 is a block diagram illustrating an example architecture for hybrid language translation via a mobile device, in accordance with aspects of the present disclosure.

FIG. 6 is a block diagram illustrating an example architecture 600 for hybrid language translation via a mobile device, in accordance with aspects of the present disclosure. Referring to FIG. 6, the architecture 600 may include an automatic speech recognition (ASR) model 604 that may convert a speech input signal to a text or digital representation. The architecture 600 may also include a classifier 614, a natural language unit (NLU) 620 and a text-to-speech (TTS) module 630. In some implementations, the classifier may be implemented as a recurrent neural network (RNN) or a long short term memory (LSTM) network. A recurrent neural network is an artificial neural network where connections feedback. Sequential or time series data may be used. A LSTM network is particular type of RNN that can learn order dependence. The NLU 620 may compute a natural language translation of the representation of the speech input 602 to a second language (e.g., French, German, Spanish).

A speech input 602 in a first language (e.g., English, Spanish, French) may be received by the ASR model 604. The ASR model 604 may be included on a mobile device. The speech input 602 may also be transmitted to a remote computing device (e.g., cloud server) 616 to compute a translation of the speech input 602.

The ASR model 604 includes a feature extraction module 606, an acoustic model 608, a decoder 610, and a language model (e.g., N-gram model) 612. The feature extraction module 606 may extract a set of features of the speech input 602. In some implementations, the feature extraction is performed with well-known Mel-frequency cepstral coefficients (MFCC) technique. The set of extracted features may be supplied to the acoustic model 608. The acoustic model 608 may represent a relationship between the speech input and linguistic units (e.g., phonemes) based on the extracted features. In some implementations, the acoustic model 608 is implemented with a Gaussian mixture model LSTM-HMMs (hidden Markov models). The output of the acoustic model 608 is supplied to the decoder 610. The decoder 610 may reconstruct one or more words based on the output of the acoustic model 608. The language model 612 may assign probabilities to a sequence of words output from the decoder 610.

The ASR model 604 outputs a representation of the speech input 602 in the first language to the NLU 620 via the decoder 610. The NLU 620 may compute a natural language translation of the representation of the speech input 602 to a second language (e.g., French, German, Spanish). In addition, the ASR model 604 may output the representation of the speech input to the classifier 614. The classifier 614 may determine an identification of each of the words in the speech input, which may then be used to compute an on-device confidence metric 622.

The on-device confidence metric 622 may be generated to indicate a probability that the translation is correct. The on-device confidence metric 622 may be computed based on a prediction corresponding to the natural language translation determined via the NLU 620 and the identification of the words of the speech input determined via the classifier 614. The natural translation determined via the NLU 620 (may be referred to as the on-device translation) and the on-device confidence metric 622 may be supplied to a correction module 628.

The remote computing device 616 may likewise process the speech input 602 and generate a natural language translation, which may be supplied as a cloud output 624 to the mobile device. In addition, the remote computing device 616 may also calculate a cloud confidence metric 626 based on the cloud output 624. The cloud confidence metric 626 may be received by a mobile device (e.g., 708). The cloud output 624 (may be referred to as cloud-based translation 624) and the cloud confidence metric 626 may be supplied to the correction module 628. The correction module 628 may determine whether a correction of the on-device translation is indicated. For example, a correction may be indicated when the on-device translation is different than the cloud-based translation 624. In such case, the correction module 628 may then compare the on-device confidence metric 622 with the cloud confidence metric 626. If the on-device confidence metric 622 is greater than the cloud confidence metric 626, then the on-device translation may be preferred as output. On the other hand, if the cloud confidence metric 626 is greater than the on-device confidence metric 622, then the cloud-based translation 624 may be preferred as output.

In some aspects, the correction module 628 may determine whether a correction is indicated based on a preference for the cloud-based translation 624. For instance where the cloud confidence metric 626 is given as $\sigma^c=((x_0, y_0^c), (x_1, y_1^c), \ldots, (x_T, y_T^c))$ and on-device confidence metric 622 is given by $\sigma^l=((x_0, y_0^c), (x_1, y_1^l), \ldots, (x_T, y_T^l))$, the probability of preferring the cloud confidence metric 626 over the on-device confidence metric 622 may be given by:

$$\hat{P}[\sigma^c > \sigma^l] = \frac{\exp\sum \hat{r}(x_t, y_t^c)}{\exp\sum \hat{r}(x_t, y_t^c) + \exp\sum \hat{r}(x_t, y_t^l)}, \quad (5)$$

where $x_t$, $y_t^c$ are input features of the cloud-based translation, $x_t$, $y_t^l$ are input features of the on-device translation, and $\hat{r}$ is the confidence model for computing the confidence metric.

A loss function may be computed as follows:

$$\text{loss}(\hat{r}) = - \sum_{(\sigma^c, \sigma^l, \mu) \in D} \mu(c)\log\hat{P}[\sigma^c > \sigma^l] + \mu(l)\log\hat{P}[\sigma^l > \sigma^c], \quad (6)$$

where $\mu$ is a distribution defined on [0,1]. In some aspects, the correction module 628 may be fine-tuned such that $\hat{P}[\sigma^c > \sigma^l]$ where the symbol > indicates $\sigma^c$ succeeds $\sigma^l$.

Accordingly, the correction module 628 may select the on-device translation (generated via NLU 620) or the cloud-based translation 624 to be output via the mobile device. In some aspects, the correction module 628 may supply the on-device translation for output as well as a correction determined based on the cloud-based translation 624.

The output of the correction module 628 may be provided to the TTS module 630. The TTS module 630 processes the selected translation (e.g., the output of the correction module 628) via a speech synthesizer 632 and voice encoder 634 to generate an audible speech output 640 via the device. As such, the architecture 600 may receive a speech input 602 in a first natural language (e.g., English, French or Spanish) and may generate a speech output 640 in a second, different natural language (e.g., Italian, German or Japanese)

Figure 7A:
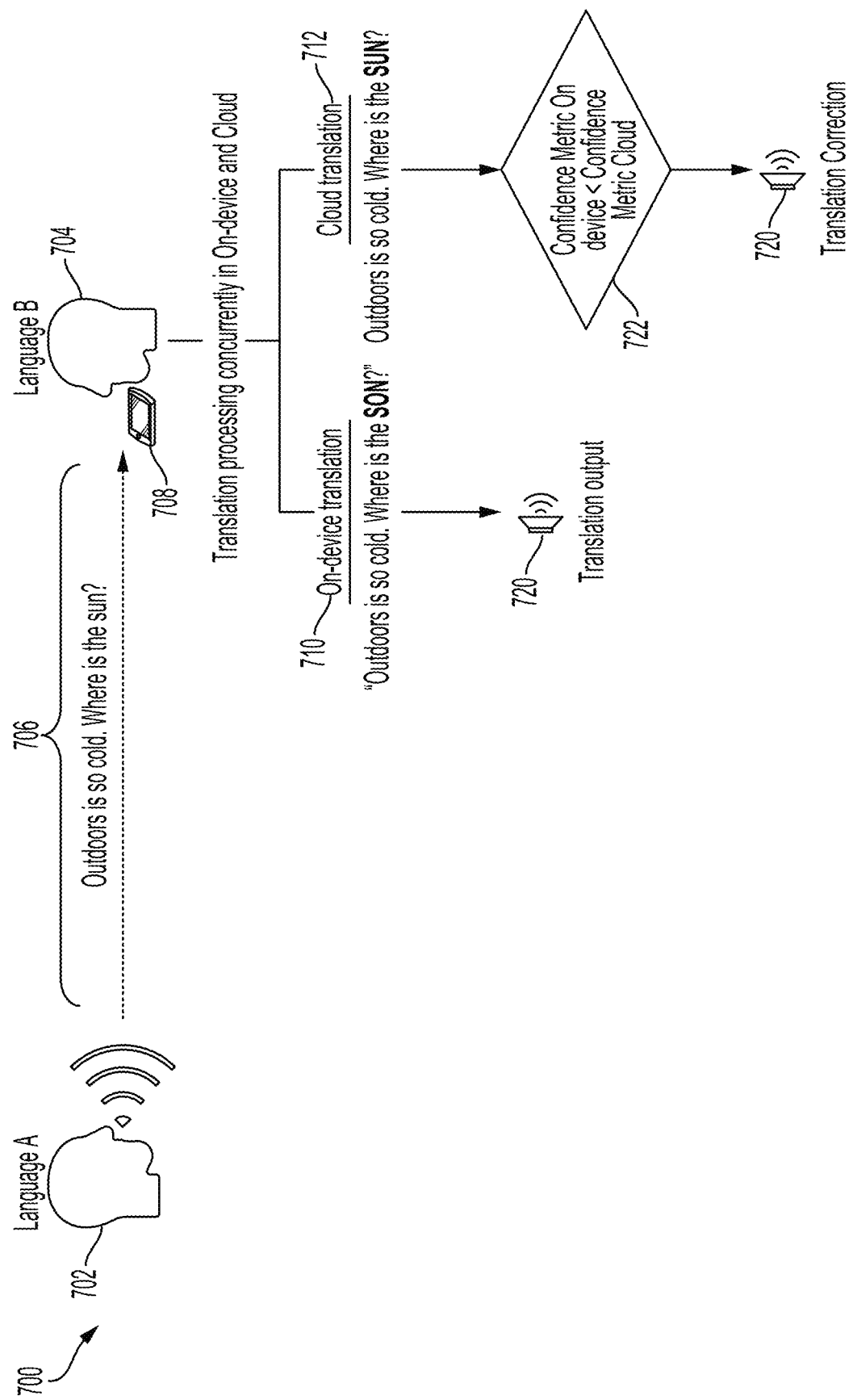
FIG. 7A is a diagram illustrating an example hybrid translation, in accordance with aspects of the present disclosure.

FIG. 7A is a diagram illustrating an example hybrid translation 700, in accordance with aspects of the present disclosure. Referring to FIG. 7A, a first person 702 is attempting to have a conversation with a second person 704. The first person 702 may speak a first natural language, such as English, for example. The second person 704 may speak a second (different) natural language, such as Italian, for example. In this example, the first person 702 may not speak or understand the second natural language, and the second person 704 may not speak or understand the first natural language.

As shown in FIG. 7A, the first person 702 may speak a phrase 706 directed to the second person 704, such as "Outdoors is so cold. Where is the sun?" The second person 704 may have a mobile device 708 configured for hybrid translation. The mobile device 708 may receive the speech signal corresponding to the spoken phrase 706, via a microphone on the mobile device 708 or other audio sensor input (e.g., sensors 114 shown in FIG. 1). In some aspects, the microphone or audio sensor input may be included in an earbud (not shown) worn in an ear of the second person 704. The mobile device 708 may determine an on-device translation. In doing so, the mobile device 708 may locally process the phrase 706 via an artificial neural network model to determine a translation. The mobile device 708, may also request a translation via a remote server (e.g., cloud-based translation). The remote server (e.g., 616 shown in FIG. 6) may be configured with a deep neural network (e.g., deep convolutional network 350 shown in FIG. 3). The remote server may be configured with significantly more compute resources than the mobile device 708. In addition, in some aspects, the remote server may be trained for context recognition such that the remote server may recognize accents, dialects, culture, and group history, for instance. Furthermore, the remote server may generate translations based on the context recognition. A confidence score or metric may be calculated for the translation indicating the accuracy of the translation or a probability that the translation is correct. The translation and the confidence metric may be transmitted to the mobile device 708.

While the remote server is computing a translation for the phrase 706, the mobile device 708 may concurrently (e.g., in parallel) process the phrase 706 via the local neural network model to determine an on-device translation 710. The mobile device 708 may also calculate a confidence score or metric, which may be calculated for the on-device translation 710 indicating the accuracy of the on-device translation 710 or a probability that the on-device translation 710 is correct.

In the example of FIG. 7A, the mobile device 708 generates an on-device translation 710, such as "Outdoors is so cold. Where is the SON?" On the other hand, the received cloud-based translation 712 is "Outdoors is so cold. Where is the SUN?" Because the on-device translation 710 is different than the cloud-based translation 712, the hybrid translation may determine a translation to use based on the confidence metric. For example, at 722 the hybrid translation 700 may determine whether on-device confidence metric is less than the cloud-based confidence metric.

Figure 7B:
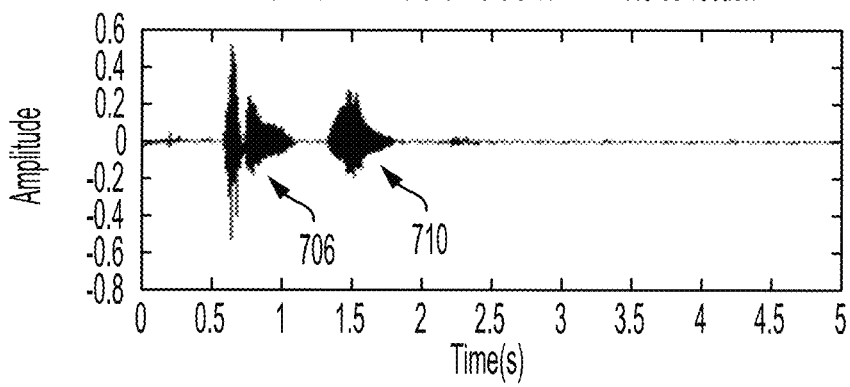
FIGS. 7B-C are timing diagrams of speech signals illustrating example hybrid translations, in accordance with aspects of the present disclosure.
Figure 7C:
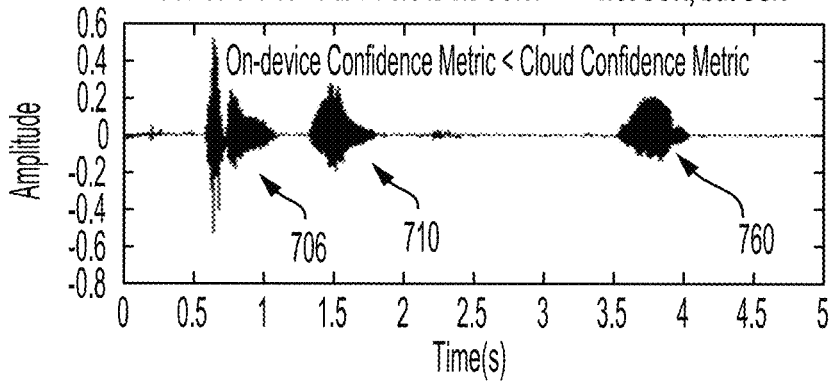

FIGS. 7B-C are timing diagrams of speech signals illustrating example hybrid translations 730 and 750, in accordance with aspects of the present disclosure. In the example hybrid translation 730, because the on-device confidence metric is greater than or equal to the cloud-based confidence metric, the on-device translation 710 may be output via an audio output 720 of the mobile device 708, for example, without correction. On the other hand, in the example hybrid translation 750, because the confidence metric for the cloud-based translation 712 is greater than the confidence metric for the on-device translation 710, the mobile device 708 may output the on-device translation 710 via the audio output 720 of the mobile device 708. In addition, the hybrid translation 700 may determine a correction for the on-device translation 710 based on the cloud-based translation 712. The correction may be output (e.g., 760) via the audio output 720 of the mobile device 708.

In some aspects, if the confidence metric for the cloud-based translation 712 is greater than the confidence metric for the on-device translation 710, then the mobile device 708 may select the cloud-based translation 712 for output via the audio output 720 of the mobile device 708, rather than computing a correction. As such, the mobile device 708 may output the cloud-based translation 712 as an audible output via a speaker, for example.

Figure 8A:
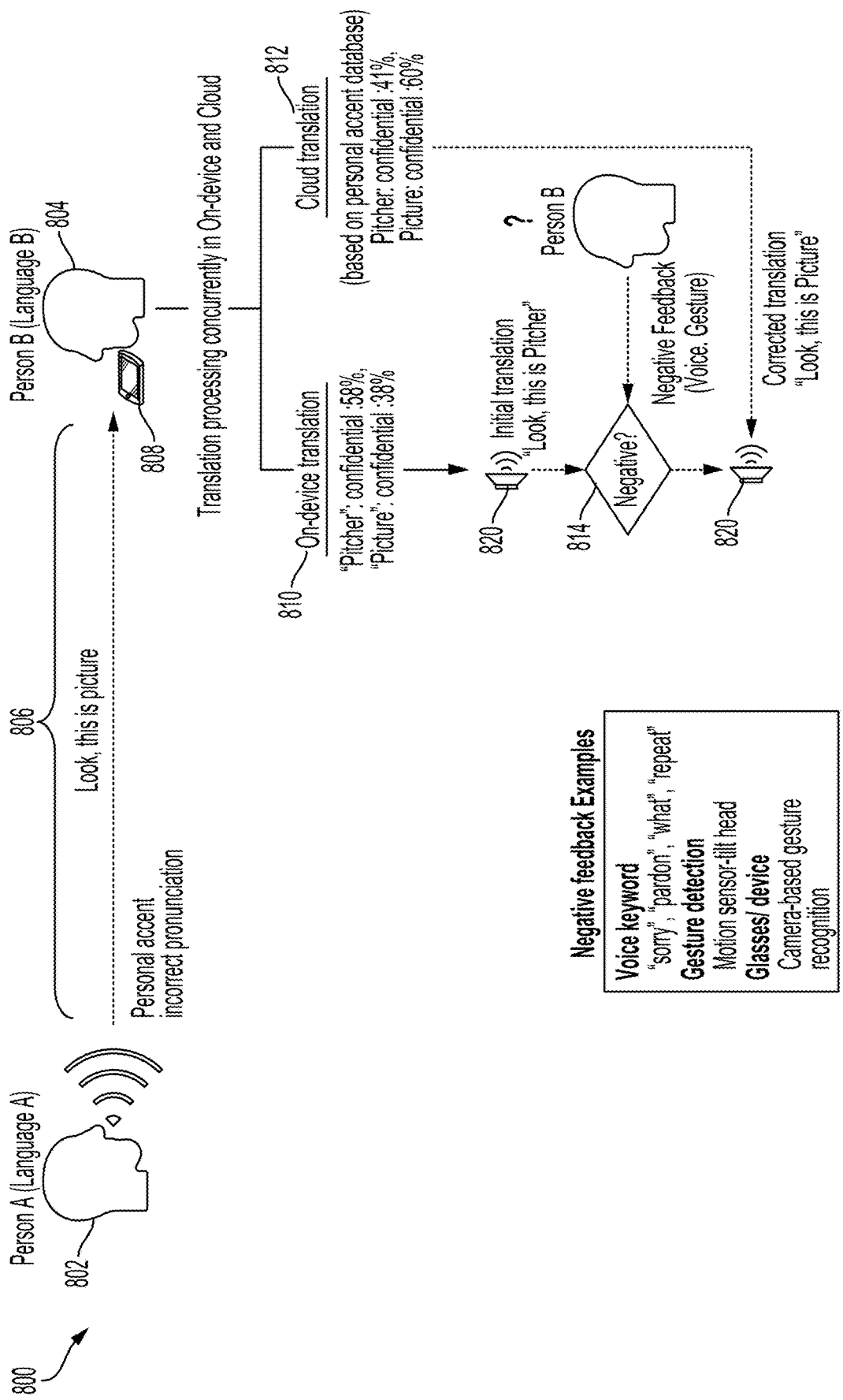
FIG. 8A is a diagram illustrating an example hybrid translation based on negative feedback, in accordance with aspects of the present disclosure.

FIG. 8A is a diagram illustrating an example hybrid translation based on negative feedback 800, in accordance with aspects of the present disclosure. Referring to FIG. 8A, a first person 802 is attempting to have a conversation with a second person 804. The first person 802 may speak a first natural language, such as English, for example. However, the first person 802 may be a non-native speaker. As such, the first person may have a personal accent and/or may use incorrect pronunciation, for example. The second person 804 may speak a second (different) natural language, such as Italian, for example. In this example, the first person 802 may not speak or understand the second natural language, and the second person 804 may not speak or understand the first natural language.

As shown in FIG. 8A, the first person 802 may speak a phrase 806 directed to the second person 804, such as "Look, this is picture?" The second person 804 may have a mobile device 808 configured for hybrid translation. The mobile device 808 may receive the speech signal corresponding to the spoken phrase 806, via a microphone on the mobile device 708 or other audio sensor input (e.g., sensors 114 shown in FIG. 1), for instance. In some aspects, the microphone or audio sensor input may be included in an earbud (not shown) worn in an ear of the second person 804. The mobile device 808 may determine an on-device translation 810. In doing so, the mobile device 808 may locally process the phrase 806 via an artificial neural network model to determine a translation. The mobile device 808, may also request a translation via a remote server (e.g., cloud-based translation). The remote server (e.g., 616 shown in FIG. 6) may be configured with a deep neural network (e.g., deep convolutional network 350 shown in FIG. 3). The remote server may be configured with significantly more compute resources (e.g., memory, processor) than the mobile device 808. In addition, in some aspects, the remote server may be trained for context recognition such that the remote server may recognize accents, dialects, culture, and group history, for instance. Furthermore, the remote server may generate translations based on the context recognition. Accordingly, the remote server may determine a translation (cloud-base translation 812) for the phrase 806. A confidence score or metric may be calculated for the cloud-based translation 812 indicating the accuracy of the translation or a probability that the translation is correct. The cloud-based translation 812 and the corresponding confidence metric may be transmitted to the mobile device 808.

While the remote server is computing a cloud-based translation 812 for the phrase 806, the mobile device 808 may concurrently (e.g., in parallel) process the phrase 806 via the local neural network model to determine the on-device translation 810. The mobile device 808 may also calculate a confidence score or metric may be calculated for the on-device translation 810 indicating the accuracy of the on-device translation 810 or a probability that the on-device translation 810 is correct.

In the example of FIG. 8A, the mobile device 808 may generates an on-device translation 810, such as "Look, this is Pitcher." The on-device translation 810 may be processed (e.g., via TTS module 630 shown in FIG. 6) and output via an audio output device 820 (e.g., a speaker) of the mobile device 808.

Additionally, the example hybrid translation 800 may determine whether the second person 804 has a negative response 814 to the translation output (e.g., 810). The negative response 814 may be detected via a sensor of the mobile device 808 (e.g., microphone, camera, motion-sensor, or other sensor). The negative response 814 may, for example, be indicated based on detection of a voice keyword or utterance such as "sorry", "huh", "pardon", "what", or "repeat" or the like. In another example, the negative response 814 may be indicated based on detection of a gesture such as a head tilt or a facial expression. The negative response 814 may be supplied as feedback and used to determine a corrected translation. The corrected translation may also be determined based on the confidence metrics associated with the on-device and cloud-based translations 810, 812. A difference between the on-device translation 810 and the cloud-based translation may be determined. In the example, of FIG. 8A, the difference between the translations (810, 812) is whether the translation for the phrase 806 should include the word "pitcher" (on device translation 810) or "picture" (cloud-based translation). The on-device confidence metric indicates a confidence score of 58% for the word "pitcher" and a confidence score of 38% for the word "picture." On the other hand, the cloud-based confidence metric indicates a confidence score of 60% for the word "picture" and a confidence score of 41% for the word "pitcher." Because the confidence score for the cloud-based translation 812 (e.g., 60% for "picture") is greater than the confidence score for the on-device translation 710 (e.g., 58% for "pitcher"), the corrected translation may be generated using the word "picture" instead of "pitcher." Accordingly, the corrected translation may be processed and output via the audio output 820 of the mobile device 808.

In some aspects, a preference for the cloud-based translation 812 is employed. Accordingly, in some aspects, when negative feedback is detected, the cloud based translation 812 may be output. In some aspects, the corrected translation may generated using the cloud based translation for the difference. For example, if the cloud-based confidence metric for the word "picture" was less than the on-device confidence metric for the word "pitcher", the word "picture", the corrected translation may be generated with the word "picture" based on the preference for the cloud-based translation.

In some aspects, corrected translation may be generated based on a threshold. For example, the on-device translation 810 may be output if the confidence metric associated with the on-device translation 810 exceeds a threshold (e.g., >95%).

Furthermore, in some aspects, the on-device translation model (e.g., NLU 620) may be updated based on the corrected translation.

Figure 8B:
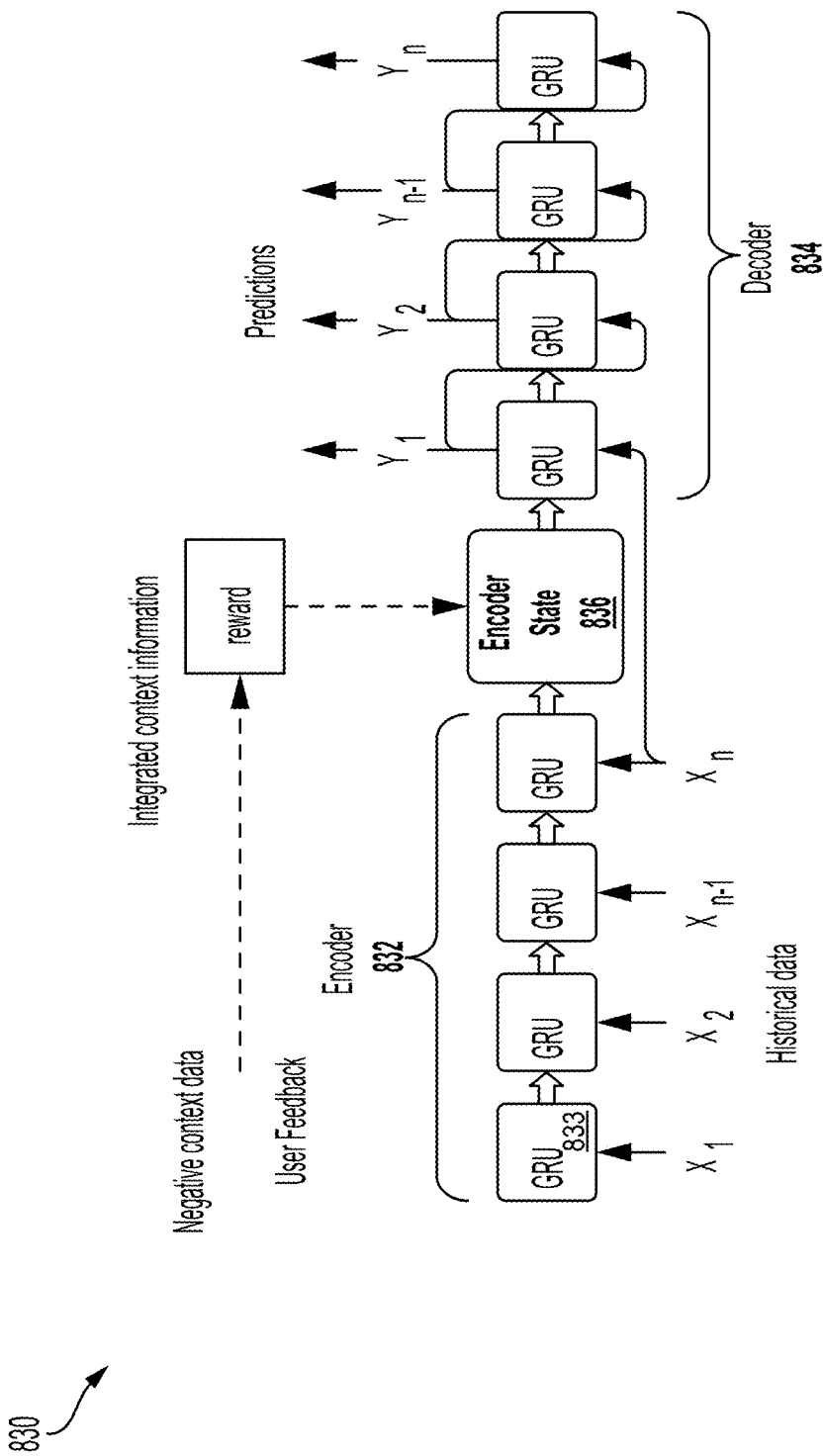
FIG. 8B is a block diagram illustrating example architecture for hybrid translation based on negative feedback, in accordance with aspects of the present disclosure.

FIG. 8B is a block diagram illustrating example architecture 830 for hybrid translation based on negative feedback, in accordance with aspects of the present disclosure. Referring to FIG. 8B, the architecture 830 may include an encoder 832 and a decoder 834. The encoder 832 may include a set of gated recurrent units (GRUs) 833, which may maintain historical data for hybrid translations. The decoder 834 may be similarly configured with a set of GRUs. The decoder 834 may receive from the encoder 832, an encoder state 836. The encoder state 836 may be updated based on negative feedback (e.g., utterance or facial expression). As shown in FIG. 8B, if negative feedback is received, a reward may be applied to adjust the encoder state 836. Accordingly, the decoder 834 may update the prediction such that an appropriate output (e.g., corrected translation) may be determined.

Figure 8C:
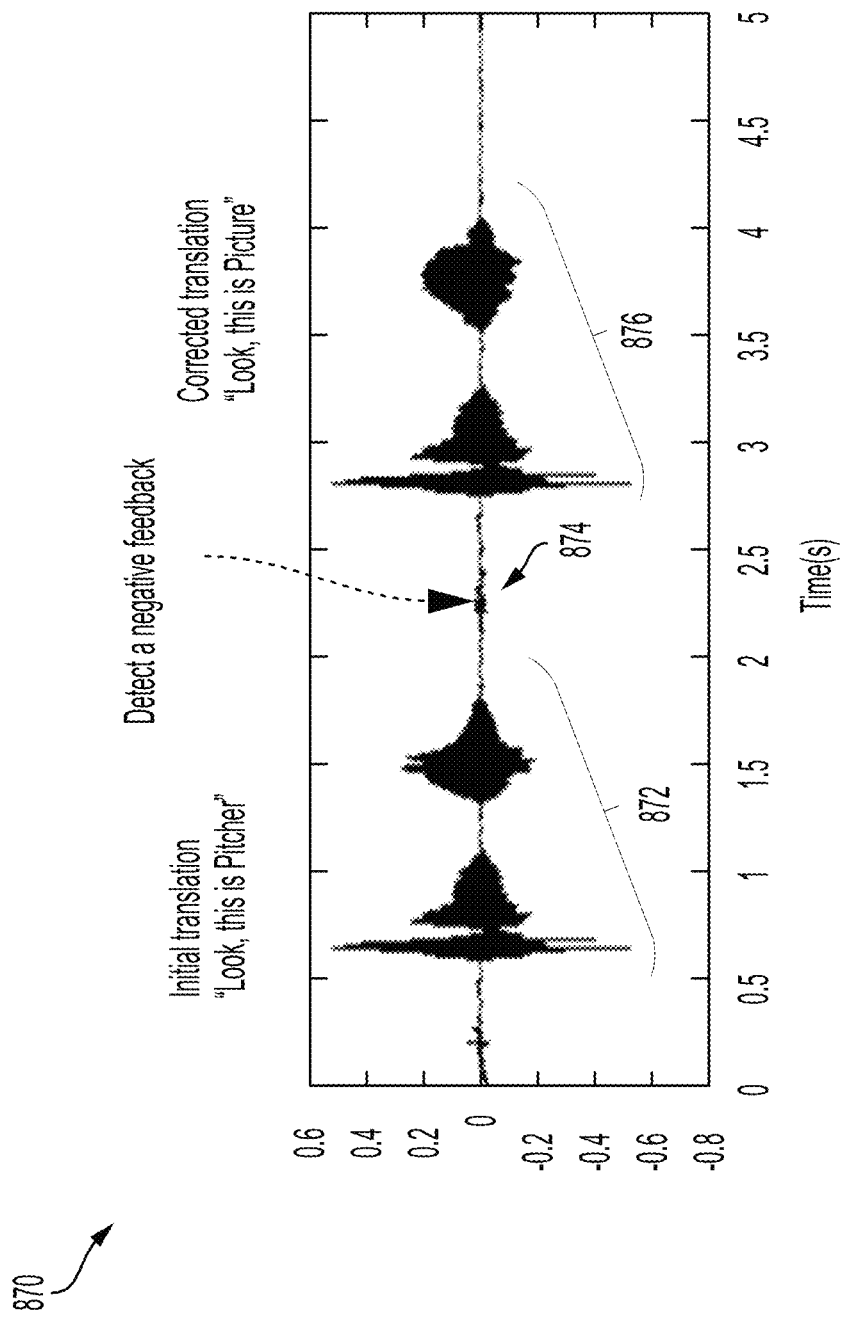
FIG. 8C is a timing diagram of a speech signal illustrating example hybrid translation corrected based on negative feedback, in accordance with aspects of the present disclosure.

FIG. 8C is a timing diagram of a speech signal illustrating example hybrid translation corrected based on negative feedback 870, in accordance with aspects of the present disclosure. Referring to FIG. 8C, a speech signal 872 corresponding to an initial translation may be output, for instance via the audio output 820 of the mobile device 808. Thereafter, a speech signal 874 corresponding to negative feedback (e.g., an utterance such as "what" or "pardon") may be detected, for example via a sensor (e.g., a microphone) of the mobile device 808. In response to detecting the speech signal 874 corresponding to the negative feedback, a corrected translation may be determined. In turn, a speech signal 876 corresponding to the corrected translation may be output via the audio output 820 of the mobile device 808.

Figure 8D:
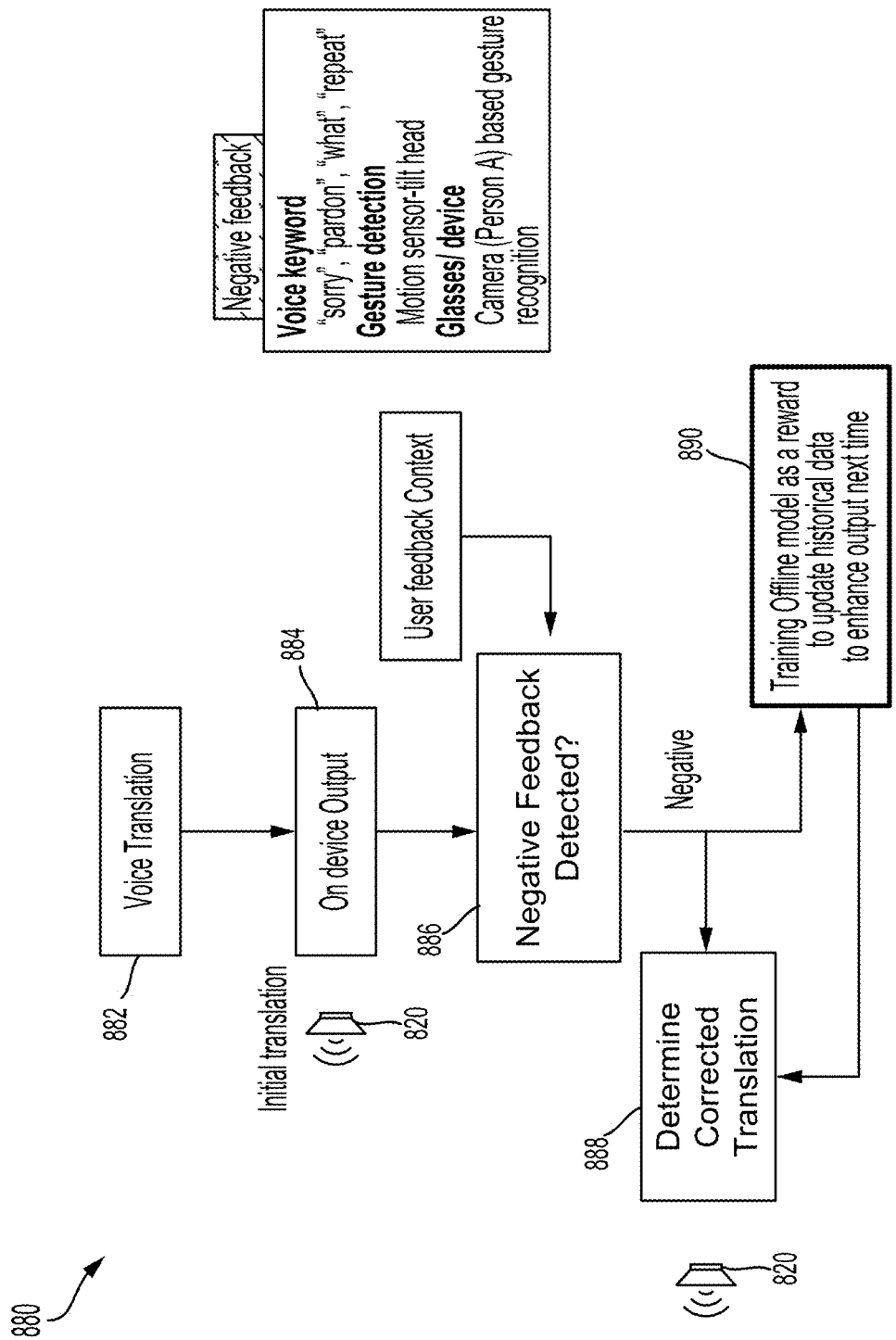
FIGS. 8D and 8E are flow diagrams illustrating example processes for hybrid language translation based on negative feedback, in accordance with aspects of the present disclosure.

FIG. 8D is a flow diagram illustrating an example process 880 for hybrid translation based on negative feedback, in accordance with aspects of the present disclosure. As shown in FIG. 8D, at block 882, an initial voice translation (e.g., on-device translation 810) is determined. At block 884, the initial translation is output, for instance via an audio output 820 of the mobile device 808. At block 886, a determination of whether negative user feedback is detected. If negative feedback has been detected, at block 888, a corrected translation may be determined based on the cloud-based translation 812. In some aspects, the corrected translation may be determined based on an alternate offline output. The alternate offline output may be generated based on updated historical data, for instance. The corrected translation may be output, for instance via an audio output 820 of the mobile device 808.

At block 890, the hybrid translation model may be trained offline based on the negative feedback. For example, negative feedback may be supplied as a reward to update historical data and thereby improve a subsequent prediction for translation output (e.g., on-device translation 810).

Figure 8E:
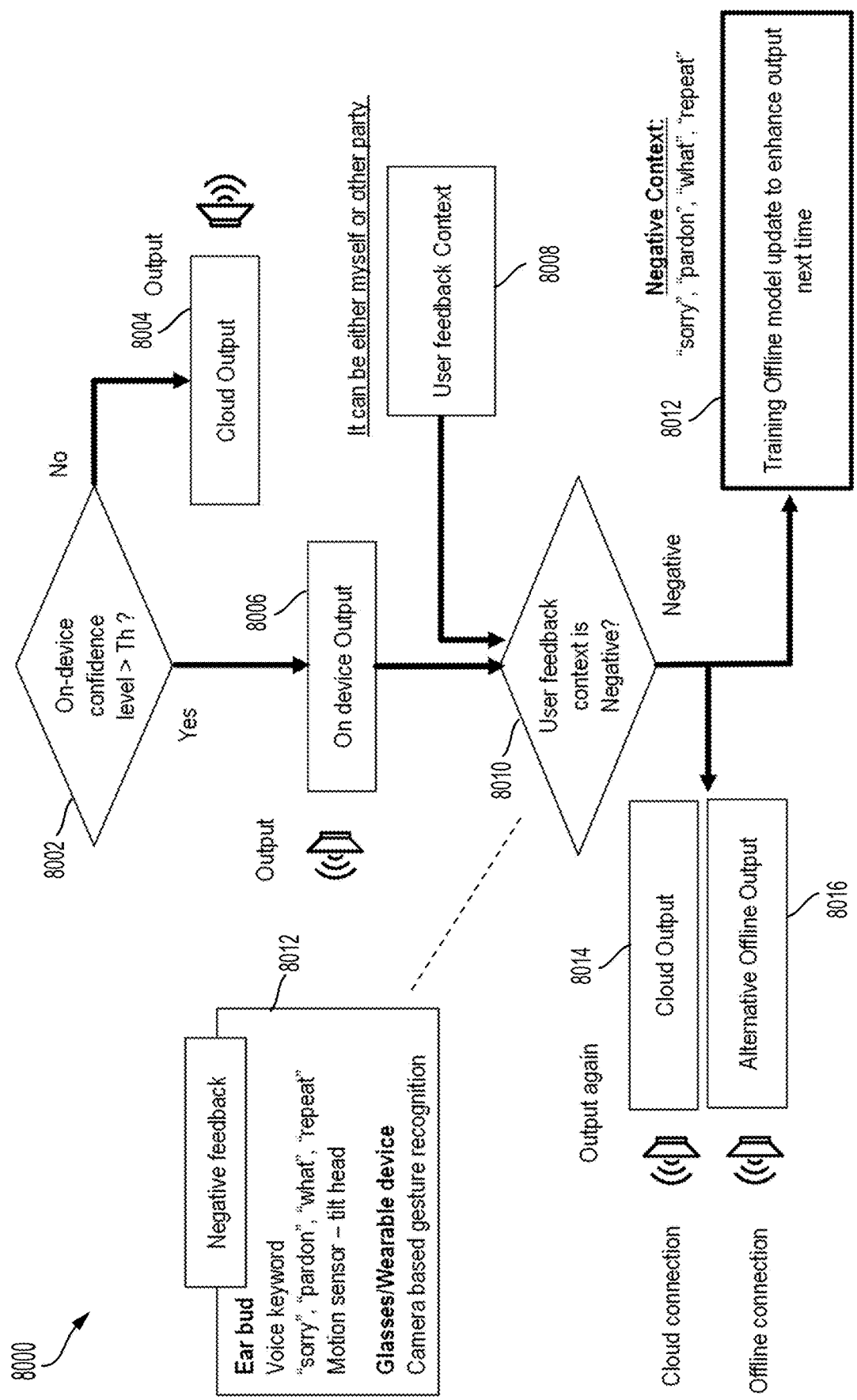

FIG. 8E is a flow diagram illustrating an example process 8000 for hybrid translation based on negative feedback, in accordance with aspects of the present disclosure. As shown in FIG. 8E, at block 8002 it is determined if an on-device confidence level in a translation is greater than a threshold (Th). If not, at block 8004 a translation generated from the cloud is output. If the confidence level is greater than the threshold at block 8002, the on-device translation is output at block 8006.

At block 8008, user feedback context for the output (at block 8006) may be generated either by the user of the mobile device or another party. Based on the feedback and the output, at block 8010 it is determined whether the user feedback context is negative. For example, negative feedback from a microphone (e.g., ear bud) may be determined based on keywords, such as "sorry" or "pardon" or "what" or "repeat." A motion sensor may detect a tilted head as another indication of negative feedback. For glasses or other wearable devices, the negative feedback may be recognized with camera based gesture recognition.

When negative feedback is determined to have been received at block 8010, at block 8012, the offline model may be trained and updated to enhance output for the next translation attempt. At block 8014, another translation may be output based on cloud processing (e.g., a cloud generated translation), if a cloud connection is available. At block 8016, an alternative offline translation may be generated and output if the mobile device is offline (e.g., no cloud connection is available).

Figure 9:
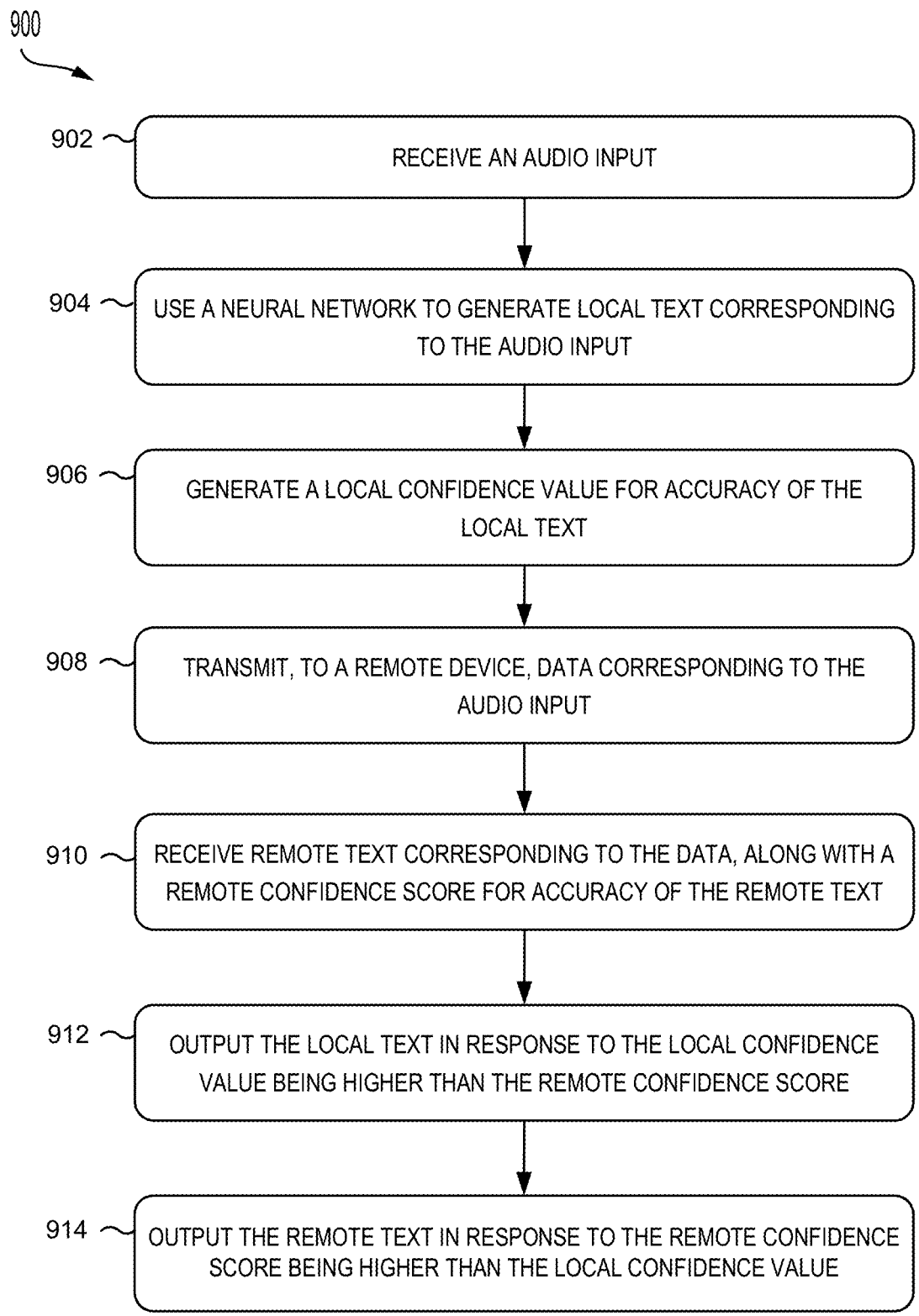
FIGS. 9 and 10 are flow diagrams illustrating processes for hybrid translation on a mobile device via an artificial neural network, in accordance with aspects of the present disclosure.

FIG. 9 is a flow diagram illustrating a process 900 for hybrid speech recognition on a mobile device via an artificial neural network, in accordance with aspects of the present disclosure. At block 902, the process 900 includes receiving an audio input. The input may be received via a sensor on the mobile device. At block 904, the process 900 includes using a neural network to generate local text corresponding to the audio input. As described with reference to FIG. 7A, while the remote server is computing a translation for the phrase 706, the mobile device 708 may concurrently (e.g., in parallel) process the phrase 706 via the local neural network model to determine an on-device translation 710.

At block 906, the process 900 includes generating a local confidence value for accuracy of the local text. For example, as described with reference to FIG. 7A, the mobile device 708 may calculate a confidence score or metric, which may be calculated for the on-device translation 710 indicating the accuracy of the on-device translation 710 or a probability that the on-device translation 710 is correct.

At block 908, the process 900 includes transmitting, to a remote device, data corresponding to the audio input. For instance, as described with reference to FIG. 7A, the mobile device 708, may request a translation via a remote server (e.g., cloud-based translation). The remote server (e.g., 616 shown in FIG. 6) may be configured with a deep neural network (e.g., deep convolutional network 350 shown in FIG. 3).

At block 910, the process 900 includes receiving remote text corresponding to the data, along with a remote confidence score for accuracy of the remote text. As described, for instance, with reference to FIG. 7A, the remote server may generate translations based on the context recognition. A confidence score or metric may be calculated for the translation indicating the accuracy of the translation or a probability that the translation is correct. The translation and the confidence metric may be transmitted to the mobile device 708.

At block 912, the process 900 includes outputting the local text in response to the local confidence value being higher than the remote confidence score; and at block 914, the process 900 includes outputting the remote text in response to the remote confidence score being higher than the local confidence value. For instance, in the example of FIG. 7A, the mobile device 708 generates an on-device translation 710, such as "Outdoors is so cold. Where is the SON?" On the other hand, the received cloud-based translation 712 is "Outdoors is so cold. Where is the SUN?" Because the on-device translation 710 is different than the cloud-based translation 712, the hybrid translation may determine a translation to use based on the confidence metric. For example, at 722, the hybrid translation 700 may determine whether on-device confidence metric is less than the cloud-based confidence metric.

Figure 10:
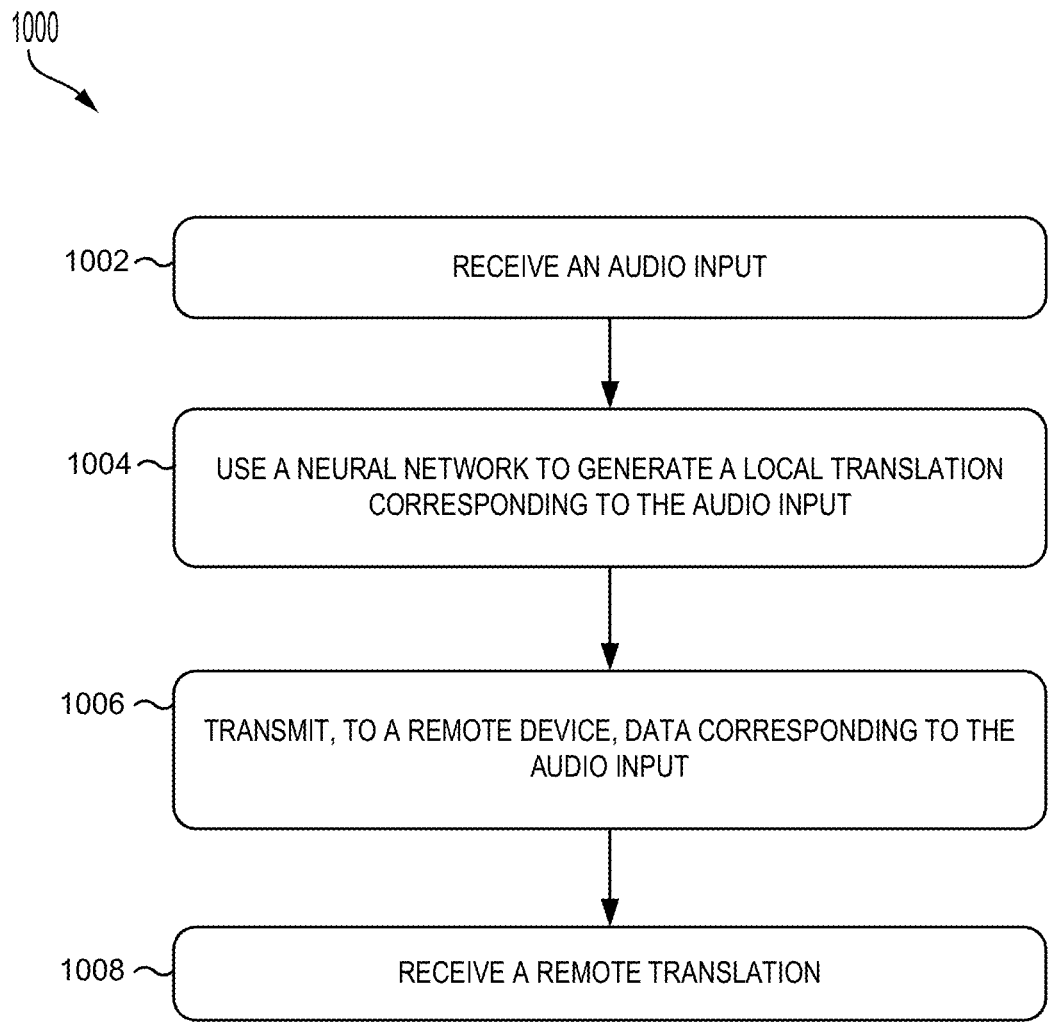

FIG. 10 is a flow diagram illustrating a process 1000 for hybrid speech recognition on a mobile device via an artificial neural network, in accordance with aspects of the present disclosure. At block 1002, the process 1000 includes receiving an audio input. The audio input may be received via an audio sensor on the mobile device. As shown in FIG. 8A, the first person 802 may speak a phrase 806 directed to the second person 804, such as "Look, this is picture?" The second person 804 may have a mobile device 808 configured for hybrid translation. The mobile device 808 may receive the speech signal corresponding to the spoken phrase 806, via a microphone on the mobile device 708 or other audio sensor input (e.g., sensors 114 shown in FIG. 1), for instance. In some aspects, the microphone or audio sensor input may be included in an earbud (not shown) worn in an ear of the second person 804.

At block 1004, the process 1000 includes using a neural network to generate a local translation corresponding to the audio input. For instance, as described with reference to FIG. 8A, while the remote server is computing a cloud-based translation 812 for the phrase 806, the mobile device 808 may concurrently (e.g., in parallel) process the phrase 806 via the local neural network model to determine the on-device translation 810.

At block 1006, the process 1000 includes transmitting, to a remote device, data corresponding to the audio input. At block 1008, the process 1000 includes receiving a remote translation. As described with reference to FIG. 8A, the mobile device 808, may also request a translation via a remote server (e.g., cloud-based translation). The remote server (e.g., 616 shown in FIG. 6) may be configured with a deep neural network (e.g., deep convolutional network 350 shown in FIG. 3). The remote server may be configured with significantly more compute resources (e.g., memory, processor) than the mobile device 808. In addition, in some aspects, the remote server may be trained for context recognition such that the remote server may recognize accents, dialects, culture, and group history, for instance.

Example Aspects

Implementation examples are provided in the following numbered clauses:

Aspect 1: A processor-implemented method for recognizing a natural language on a mobile device, comprising: receiving an audio input; using a neural network to generate local text corresponding to the audio input; generating a local confidence value for accuracy of the local text; transmitting, to a remote device, data corresponding to the audio input; receiving remote text corresponding to the data, along with a remote confidence score for accuracy of the remote text; outputting the local text in response to the local confidence value being higher than the remote confidence score; and outputting the remote text in response to the remote confidence score being higher than the local confidence value.

Aspect 2: The processor-implemented method of Aspect 1, in which the data comprises raw data.

Aspect 3: The processor-implemented method of Aspect 1, in which the data comprises extracted features of the audio input.

Aspect 4: The processor-implemented method of any of the preceding Aspects, in which the remote device is a cloud server.

Aspect 5: The processor-implemented method of any of the preceding Aspects, in which the local text and the remote text are translations of the audio input.

Aspect 6: The processor-implemented method of any of the preceding Aspects, in which the outputting comprises outputting speech after text to speech processing.

Aspect 7: A processor-implemented method for recognizing a natural language on a mobile device, comprising: receiving an audio input; using a neural network to generate a local translation corresponding to the audio input; transmitting, to a remote device, data corresponding to the audio input; and receiving a remote translation.

Aspect 8: The processor-implemented method of Aspect 7, in which the data comprises raw data.

Aspect 9: The processor-implemented method of Aspect 7, in which the data comprises extracted features of the audio input.

Aspect 10: The processor-implemented method of any of the Aspects 7-9, further comprising: receiving negative feedback from a first user for a first translation; generating a corrected translation based on the negative feedback; and outputting the corrected translation via the mobile device.

Aspect 11: The processor-implemented method of any of the Aspects 7-10, in which the negative feedback comprises one or more of predefined voice keywords, motion sensor feedback, or video input responsive to the first translation.

Aspect 12: The processor-implemented method of any of the Aspects 7-10, in which the first translation is determined via a first artificial neural network of the mobile device, the negative feedback is encoded as a reward in a deep neural network and the first artificial neural network is updated based on the negative user feedback.

Aspect 13: The processor-implemented method of any of the Aspects 7-10, in which the first translation and the corrected translation are output via an audio output of the mobile device.

Aspect 14: An apparatus for recognizing a natural language on a mobile device, comprising: a memory; and at least one processor coupled to the memory, the at least one processor configured: to receive an audio input; to use a neural network to generate local text corresponding to the audio input; to generate a local confidence value for accuracy of the local text; to transmit, to a remote device, data corresponding to the audio input; to receive remote text corresponding to the data, along with a remote confidence score for accuracy of the remote text; to output the local text in response to the local confidence value being higher than the remote confidence score; and to output the remote text in response to the remote confidence score being higher than the local confidence value.

Aspect 15: The apparatus of Aspect 14, in which the data comprises raw data.

Aspect 16: The apparatus of Aspect 14, in which the data comprises extracted features of the audio input.

Aspect 17: The apparatus of any of the Aspects 14-16, in which the remote device is a cloud server.

Aspect 18: The apparatus of any of the Aspects 14-17, in which the local text and the remote text are translations of the audio input.

Aspect 19: The apparatus of any of the Aspects 14-18, in which the at least one processor is further configured to output speech after text to speech processing.

Aspect 20: An apparatus for recognizing a natural language on a mobile device, comprising: a memory; and at least one processor coupled to the memory, the at least one processor configured: to receive an audio input; to use a neural network to generate a local translation corresponding to the audio input; to transmit, to a remote device, data corresponding to the audio input; and to receive a remote translation.

Aspect 21: The apparatus of Aspect 20, in which the data comprises raw data.

Aspect 22: The apparatus of Aspect 20, in which the data comprises extracted features of the audio input.

Aspect 23: The apparatus of any of the Aspects 20-22, in which the at least one processor is further configured: to receive negative feedback from a first user for a first translation; to generate a corrected translation based on the negative feedback; and to output the corrected translation via the mobile device.

Aspect 24: The apparatus of any of the Aspects 20-23, in which the negative feedback comprises one or more of predefined voice keywords, motion sensor feedback, or video input responsive to the first translation.

Aspect 25: The apparatus of any of the Aspects 20-24, in which the first translation is determined via a first artificial neural network of the mobile device, the negative feedback is encoded as a reward in a deep neural network and the first artificial neural network is updated based on the negative user feedback.

Aspect 26: The apparatus of any of the Aspects 20-25, in which the first translation and the corrected translation are output via an audio output of the mobile device.

In one aspect, the receiving means, transmitting means, determining means, calculating means, and selecting means may be the CPU 102, program memory associated with the CPU 102, and/or the dedicated memory block 118 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method for recognizing a natural language on a mobile device, comprising:
   receiving, by a neural network on the mobile device, an audio input;
   processing, by the neural network, the audio input to generate a translation of the audio input to local text representing the audio input;
   generating a local confidence metric corresponding to a first accuracy of the local text representing the audio input;
   transmitting, to a remote device, data corresponding to the audio input;
   receiving, from the remote device, remote text representing the data and a remote confidence metric corresponding to a second accuracy of the remote text representing the data corresponding to the audio input; and
   outputting, by the mobile device, one of the local text or the remote text based on a comparison of the local confidence metric and the remote confidence metric.

2. The processor-implemented method of claim 1, in which the local text is output by the mobile device when the local confidence metric is greater than the remote confidence metric and the remote text is output by the mobile device when the remote confidence metric is greater than the local confidence metric.

3. The processor-implemented method of claim 1, in which the data comprises raw data or extracted features of the audio input.

4. The processor-implemented method of claim 1, in which the remote device is a cloud server.

5. The processor-implemented method of claim 1, in which the outputting comprises outputting speech after text to speech processing.

6. A processor-implemented method for recognizing a natural language on a mobile device, comprising:
   receiving an audio input in a first language;
   generating, using an artificial neural network at the mobile device, a local translation of the audio input from the first language to a second language corresponding to the audio input;
   receiving negative feedback from a first user for the local translation;
   transmitting, to a remote device, data corresponding to the audio input; and
   receiving a remote translation of the data representing the audio input in the first language to the second language.

7. The processor-implemented method of claim 6, in which the data comprises raw data.

8. The processor-implemented method of claim 6, in which the data comprises extracted features of the audio input.

9. The processor-implemented method of claim 6, further comprising:
   generating a corrected translation based on at least one of the negative feedback or the remote translation; and
   outputting the corrected translation via the mobile device.

10. The processor-implemented method of claim 9, in which the negative feedback comprises one or more of predefined voice keywords, motion sensor feedback, or video input responsive to the first local translation.

11. The processor-implemented method of claim 9, in which the first translation is determined via a first artificial neural network of the mobile device, the negative feedback is encoded as a reward in a deep neural network at the remote device and the first artificial neural network is updated based on the negative user feedback from the first user.

12. The processor-implemented method of claim 9, in which the local translation and the corrected translation are output via an audio output of the mobile device.

13. An apparatus for recognizing a natural language on a mobile device, comprising:
- at least one memory; and
- at least one processor coupled to the at least one memory, the at least one processor configured to:
  - receive, by a neural network on the mobile device, an audio input;
  - process, by the neural network, the audio input to generate a translation of the audio input to local text representing the audio input;
  - generate a local confidence metric corresponding to a first accuracy of the local text representing the audio input;
  - transmit, to a remote device, data corresponding to the audio input;
  - receive, from the remote device, remote text representing the data and a remote confidence metric corresponding to a second accuracy of the remote text representing the data corresponding to the audio input; and
  - output, by the mobile device, one of the local text or the remote text based on a comparison of the local confidence metric and the remote confidence metric.

14. The apparatus of claim 13, in which the local text is output by the mobile device when the local confidence metric is greater than the remote confidence metric and the remote text is output by the mobile device when the remote confidence metric is greater than the local confidence metric.

15. The apparatus of claim 13, in which the data comprises raw data or extracted features of the audio input.

16. The apparatus of claim 13, in which the remote device is a cloud server.

17. The apparatus of claim 13, in which the at least one processor is further configured to output speech after text to speech processing.

18. An apparatus for recognizing a natural language on a mobile device, comprising:
- at least one memory; and
- at least one processor coupled to the at least one memory, the at least one processor configured to:
  - receive an audio input in a first language;
  - generate, using an artificial neural network at the mobile device, a local translation of the audio input from the first language to a second language corresponding to the audio input;
  - receive negative feedback from a first user for the local translation;
  - transmit, to a remote device, data corresponding to the audio input; and
  - receive a remote translation of the data representing the audio input in the first language to the second language.

19. The apparatus of claim 18, in which the data comprises raw data.

20. The apparatus of claim 18, in which the data comprises extracted features of the audio input.

21. The apparatus of claim 18, in which the at least one processor is further configured to:
- generate a corrected translation based on at least one of the negative feedback or the remote translation; and
- output the corrected translation via the mobile device.

22. The apparatus of claim 21, in which the negative feedback comprises one or more of predefined voice keywords, motion sensor feedback, or video input responsive to the local translation.

23. The apparatus of claim 21, in which the negative feedback is encoded as a reward in a deep neural network at the remote device and the artificial neural network is updated based on the negative user feedback.

24. The apparatus of claim 21, in which the local translation and the corrected translation are output via an audio output of the mobile device.

* * * * *